United States Patent
Huang et al.

(10) Patent No.: US 12,024,636 B2
(45) Date of Patent: Jul. 2, 2024

(54) CONDUCTIVE COATING AND MANUFACTURING METHOD THEREOF

(71) Applicant: TAIWAN TEXTILE RESEARCH INSTITUTE, New Taipei (TW)

(72) Inventors: Hou-Sheng Huang, New Taipei (TW); Chien-Lung Shen, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 0 days.

(21) Appl. No.: 17/730,264

(22) Filed: Apr. 27, 2022

(65) Prior Publication Data

US 2022/0363932 A1    Nov. 17, 2022

(30) Foreign Application Priority Data

May 7, 2021  (TW) ................. 110116510

(51) Int. Cl.
| | |
|---|---|
| *C09D 11/52* | (2014.01) |
| *C09D 5/24* | (2006.01) |
| *C09D 7/80* | (2018.01) |
| *C09D 11/033* | (2014.01) |
| *C09D 11/037* | (2014.01) |
| *C09D 11/108* | (2014.01) |
| *H01B 1/24* | (2006.01) |

(52) U.S. Cl.
CPC ............ *C09D 11/52* (2013.01); *C09D 5/24* (2013.01); *C09D 7/80* (2018.01); *C09D 11/033* (2013.01); *C09D 11/037* (2013.01); *C09D 11/108* (2013.01); *H01B 1/24* (2013.01)

(58) Field of Classification Search
None
See application file for complete search history.

(56) References Cited

U.S. PATENT DOCUMENTS

| | | | |
|---|---|---|---|
| 2014/0202745 A1* | 7/2014 | Kobayashi | H05K 9/0083 252/511 |
| 2018/0233250 A1* | 8/2018 | Taguchi | H01B 13/0036 |
| 2020/0067101 A1* | 2/2020 | Pan | C09D 5/24 |

FOREIGN PATENT DOCUMENTS

| | | |
|---|---|---|
| CN | 1770930 A | 5/2006 |
| CN | 107195385 B | 3/2019 |
| CN | 109608942 A | 4/2019 |
| CN | 106433319 B | 5/2020 |
| CN | 108922654 B | 12/2020 |
| WO | 2020079473 A1 | 4/2020 |

* cited by examiner

*Primary Examiner* — Katie L. Hammer
(74) *Attorney, Agent, or Firm* — McClure, Qualey & Rodack, LLP

(57) ABSTRACT

The present disclosure provides a method of manufacturing a conductive coating which includes preparing a conductive powder, preparing a wet conductive powder, preparing a base slurry, and performing a centrifugal mixing process. A graphite and a carbon black are uniformly mixed and performed on a powder refining process to obtain the conductive powder. The conductive powder and an additive are uniformly mixed to obtain the wet conductive powder. A neoprene and a solvent are uniformly mixed and performed on a ball milling process to obtain the base slurry. 45 parts by weight to 55 parts by weight of the wet conductive powder and 45 parts by weight to 55 parts by weight of the base slurry are centrifugal mixed in a centrifugal mixing process at 900 rpm to 1000 rpm to obtain the conductive coating having a viscosity between 55000 cP and 60000 cP.

13 Claims, No Drawings

CONDUCTIVE COATING AND MANUFACTURING METHOD THEREOF

CROSS-REFERENCE TO RELATED APPLICATION

This application claims priority to Taiwan Application Serial Number 110116510, filed on May 7, 2021, which is herein incorporated by reference in its entirety.

BACKGROUND

Field of Invention

The present disclosure relates to the conductive coating. More particularly, the present disclosure relates to the conductive coating for screen-printing and manufacturing method thereof.

Description of Related Art

The electric heating module may be variously designed in fabrics, which provides the electric heating fabric with wide range of application. For example, the conductive coating can be printed on the fabric by using the screen-printing process so that the conductive coating forms various circuit patterns in the electric heating module. However, the powder of the conductive coating may aggregate in the screen-printing process. This makes it difficult to print out the uniform circuit and easy to bring disadvantages to the heat generating function of the electric heating module. Therefore, it has been focused on the manner to improve the printing uniformity of the conductive coating and the structure strength of the electric heating module formed therefrom, so as to improve the heat generating stability of the electric heating fabric.

SUMMARY

The present disclosure provides a conductive coating and the manufacturing method thereof. The formed conductive coating can be applied in a printed electric heating module of an electric heating fabric, thereby providing the electric heating fabric with high heat generating stability.

According to some embodiments of the present disclosure, a manufacturing method of the conductive coating includes preparing a conductive powder, preparing a wet conductive powder, preparing a base slurry, and performing a centrifugal mixing process. A graphite and a carbon black are uniformly mixed and performed on a powder refining process to obtain the conductive powder. The conductive powder and an additive are uniformly mixed to obtain the wet conductive powder. A neoprene and a solvent are uniformly mixed and performed on a ball milling process to obtain the base slurry. 45 parts by weight to 55 parts by weight of the wet conductive powder and 45 parts by weight to 55 parts by weight of the base slurry are centrifugal mixed in a centrifugal mixing process at 900 rpm to 1000 rpm to obtain the conductive coating having a viscosity between 55000 cP and 60000 cP.

In some embodiments, preparing the wet conductive powder includes performing a second centrifugal mixing process on 10 parts by weight to 15 parts by weight of the conductive powder and 35 parts by weight to 40 parts by weight of the additive.

In some embodiments, the second centrifugal mixing process is a dual asymmetric centrifugal mixing process with 550 rpm to 650 rpm.

In some embodiments, the additive includes 20 parts by weight to 24 parts by weight of a diluent and 1.5 parts by weight to 3.5 parts by weight of a dispersant.

In some embodiments, the additive further includes 10 parts by weight to 13 parts by weight of a stabilizer and 1.5 parts by weight to 3.5 parts by weight of a chelating agent.

In some embodiments, the stabilizer includes a heat stabilizer and a light stabilizer.

In some embodiments, preparing the base slurry includes uniformly mixing 10 parts by weight to 15 parts by weight of the neoprene and 35 parts by weight to 40 parts by weight of the solvent.

In some embodiments, the centrifugal mixing process is a dual asymmetric centrifugal mixing process.

In some embodiments, the powder refining process includes grinding the graphite and the carbon black by a homogenizer at 1100 rpm to 1200 rpm.

According to some embodiments of the present disclosure, a conductive coating includes 45 parts by weight to 55 parts by weight of a wet conductive powder and 45 parts by weight to 55 parts by weight of a base slurry. The conductive coating has a viscosity between 55000 cP and 60000 cP. The wet conductive powder includes a conductive powder composed of a graphite and a carbon black and an additive. The base slurry includes a neoprene and a solvent. A weight ratio of the neoprene and the conductive powder is between 1 and 1.5.

In some embodiments, the conductive coating includes 10 parts by weight to 15 parts by weight of the conductive powder.

In some embodiments, a weight ratio of the graphite and the carbon black in the conductive powder is between 1.8 and 2.2.

In some embodiments, a particle size of the graphite is between 2 µm and 4 µm.

In some embodiments, a particle size of the carbon black is between 38 nm and 42 nm.

In some embodiments, the conductive powder includes only nonmetals.

According to the above-mentioned embodiments, the conductive coating is manufactured by centrifugal mixing appropriate ratio of the wet conductive powder and the base slurry at a low rotational speed. Therefore, the conductive coating has the viscosity suitable for the screen-printing process. This provides the conductive coating with high printing uniformity and good electrothermal effect on the fabric so that the conductive coating can be applied in the printed electric heating fabric field. In addition, the conductive material of the wet conductive powder in the conductive coating is made up of graphite and carbon black, thereby reducing the cost and improving the environmental tolerance of the conductive coating to improve the electrothermal effect.

DETAILED DESCRIPTION

The following disclosure provides many different embodiments, or examples, for implementing different features of the provided subject matter. Specific examples of components, values, materials, etc., are described below to simplify the present disclosure. These are, of course, merely examples and are not intended to be limiting.

The present disclosure provides a conductive coating and the manufacturing method thereof. The conductive coating is manufactured by centrifugal mixing appropriate ratio of a wet conductive powder and a base slurry at a low rotational speed. As a result, the conductive coating, which includes a graphite and a carbon black as its conductive material, has suitable viscosity to show high printing uniformity and stable electrothermal effect in the screen-printing process.

According to some embodiments of the present disclosure, the manufacturing method of the conductive coating includes preparing a conductive powder, preparing a wet conductive powder, preparing a base slurry, and performing a centrifugal mixing process. In the following description, the details of each step are provided.

First, preparing the conductive powder includes uniformly mixing a graphite and a carbon black and performing a powder refining process on them to obtain the conductive powder. In some embodiments, the graphite and the carbon black may be uniformly mixed and grinded by a homogenizer at about 1100 rpm to 1200 rpm for about 30 seconds to 40 seconds. This powder refining process breaks up the aggregated graphite and carbon black to mix them together, thereby forming the uniform conductive powder. Since it is not easy for the graphite and the carbon black to be oxidized in the atmospheric environment, the conductive powder composed of the graphite and the carbon black has high environmental tolerance, which improves the heat generating stability of the later formed conductive coating. Moreover, the graphite and the carbon black can provide high electrothermal effect. This provides the cost reduction of the conductive powder compared to the metal material, so the total cost of the electric heating module can be reduced. It should be noted that, in some embodiments, the conductive powder may use the graphite and the carbon black for its conductive material and avoid from metal material, so that the conductive powder may include only nonmetals.

In some embodiments, the conductive powder may include appropriate ratio of the graphite and the carbon black so that the conductive coating made from the conductive powder has high electrothermal effect. For example, a weight ratio of the graphite and the carbon black in the conductive powder may be between 1.8 and 2.2. In some embodiments, the conductive powder after the powder refining process may include the graphite and the carbon black with small particle size. As such, the graphite and the carbon black distribute uniformly in the conductive coating made from the conductive powder, thereby providing the conductive coating with high smoothness in the screen-printing process. For example, in the conductive powder, the particle size of the graphite may be between 2 µm and 4 µm, and the particle size of the carbon black may be between 38 nm and 42 nm.

Then, preparing the wet conductive powder includes uniformly mixing the conductive powder and an additive to obtain the wet conductive powder. In some embodiments, about 10 parts by weight to 15 parts by weight of the conductive powder and about 35 parts by weight to 40 parts by weight of the additive may be uniformly mixed, and a dual asymmetric centrifugal (DAC) mixing process may be performed on them at about 550 rpm to 650 rpm for about 3 minutes to 4 minutes. As a result, the conductive powder and the additive with the appropriate ratio are formed into the wet conductive powder. The wet conductive powder is formed by a short time of the low rotational speed centrifugal mixing process, so the additive in the wet conductive powder does not significantly vaporize. Therefore, the viscosity of the wet conductive powder may be easily controlled, which allows the conductive coating having suitable viscosity to be formed from the wet conductive powder.

In some embodiments, the additive may include about 20 parts by weight to 24 parts by weight of a diluent and about 1.5 parts by weight to 3.5 parts by weight of a dispersant. The diluent may adjust the viscosity of the wet conductive powder, and the dispersant may increase the distribution uniformity of the conductive powder in the wet conductive powder. In some embodiments, the diluent may be octyl acetate. In some embodiments, the dispersant may be Solsperse™ 36000 purchased from Lubrizol. In some embodiments, the additive may further include about 10 parts by weight to 13 parts by weight of a stabilizer and about 1.5 parts by weight to 3.5 parts by weight of a chelating agent, thereby improving the stability of the wet conductive powder. For example, the stabilizer in the additive may include heat stabilizer and light stabilizer. The stabilizer and the chelating agent may increase the environmental tolerance of the wet conductive powder, which reduces impact of environmental factors to the wet conductive powder, such as high temperature, ultra-violet light, oxygen, or the like, on the conductive coating. In some embodiments, the heat stabilizer may be epoxidized oil. In some embodiments, the light stabilizer may be tris-(nonylphenyl) phosphite ester. In some embodiments, the chelating agent may be aminopropyl-methyl-diethoxysilane.

Preparing the base slurry includes uniformly mixing a neoprene and a solvent and performing a ball milling process on them to obtain the base slurry. In some embodiments, about 10 parts by weight to 15 parts by weight of the neoprene and about 35 parts by weight to 40 parts by weight of the solvent may be uniformly mixed and grinded by a ball mill at about 100 rpm to 200 rpm for about 4 days to 7 days to dissolve the neoprene in the solvent to obtain the base slurry. When the neoprene and the conductive powder are mixed in the subsequent process, the neoprene may act as an adhesive to adhere the particles of the conductive powder. This improves the structure strength of the electric heating module. In some embodiments, the solvent in the base slurry may be 2-ethylhexyl acrylate.

Then, a centrifugal mixing process is performed to obtain the conductive coating having the suitable viscosity. Specifically, 45 parts by weight to 55 parts by weight of the wet conductive powder and 45 parts by weight to 55 parts by weight of the base slurry are uniformly mixed to obtain a mixture, and a centrifugal mixing process is performed on the mixture at about 900 rpm to 1000 rpm for about 3 minutes to 4 minutes. The conductive coating is formed by using a short time of the low rotational speed centrifugal mixing process, so the fluid composition, such as the additive and the solvent, in the conductive coating does not easily evaporate. As a result, the conductive coating is formed with a viscosity between 55000 cP to 60000 cP, which is suitable for the conductive coating to be applied in the screen-printing process forming the electric heating module. In addition, the low rotational speed of the centrifugal mixing process can prevent the equipment from high temperature so that the centrifugal mixing process does not unexpectedly heat the conductive coating. This improves the stability of the conductive coating. In some embodiments, the centrifugal mixing process may be a dual asymmetric centrifugal mixing process to increase the distribution uniformity of the compositions in the conductive coating.

When the viscosity of the conductive coating is in the above-mentioned range, the conductive coating may pass through the mesh of the printing plate and form the designed pattern on the fabric. Since then, the printing uniformity of the conductive coating and the structure strength of the electric heating module may be improved. If the viscosity of the conductive coating is lower than 55000 cP, the conductive coating may be too dilute to remain its pattern on the fabric, leading to the deformation of the electric heating module formed by printing and harmful to the heat generating function of the electric heating module. If the viscosity of the conductive coating is higher than 60000 cP, the conductive coating is too sticky to be applied in printing, which makes it difficult to form the uniform circuit in the electric heating module. It should be noted that the mentioned viscosity of the conductive coating may be measured by a BROOKFIELD viscometer using spindle 21 #. In summary, the viscosity of the conductive coating affects its printing efficiency, printing uniformity, and electrothermal effect of the electric heating module formed of the conductive coating.

After the above-mentioned steps, the conductive coating is provided. In some embodiments, a weight ratio of the neoprene and the conductive powder in the conductive coating may be between about 1 and 1.5, thereby providing the conductive coating with high printing uniformity and electrothermal effect. If the weight ratio of the neoprene and the conductive powder in the conductive coating is smaller than 1, the conductive coating may aggregate so that it is hard to print the conductive coating into uniform circuit in the screen-printing process. If the weight ratio of the neoprene and the conductive powder in the conductive coating is larger than 1.5, the electric heating module formed by the conductive coating may have high bulk resistance, which reduces the electrothermal effect of the electric heating module. In some embodiments, the conductive coating may include 45 parts by weight to 55 parts by weight of the wet conductive powder and 45 parts by weight to 55 parts by weight of the base slurry, in which the conductive coating includes about 10 parts by weight to 15 parts by weight of the conductive powder, thereby providing the conductive coating with good printing uniformity. For example, if the conductive coating includes more than 15 parts by weight of the conductive powder, the conductive coating may aggregate and form rough circuit, leading to the disadvantages on the electrothermal effect of the electric heating module.

According to the mentioned embodiments of the present disclosure, the conductive coating formed by centrifugal mixing the wet conductive powder and the base slurry at low rotational speed has suitable viscosity so that the conductive coating is applicable for the screen-printing process. Since the screen-printed conductive coating forms the electric heating module with uniform circuit, the conductive coating provides the electric heating module with stable electrothermal effect and improved structure strength. Moreover, the graphite and the carbon black as the conductive powder in the conductive coating can provide high electrothermal effect and environmental tolerance, thereby reducing the cost of the conductive coating and improving the stability of the electric heating module.

In the following descriptions, a variety of measurements and evaluations were performed for the conductive coating of the present disclosure. Herein, experiments 1 to 3 are referred to illustrate the features of the present disclosure more specifically.

Experiment 1: Basic Recipe of Conductive Coating

In this experiment, the bulk resistance was measured for the conductive coating of comparative example 1 and each example. Specifically, the conductive coatings of comparative example 1 and each example were first manufactured according to the above-mentioned method. The conductive coatings were then printed onto the polyethylene terephthalate (PET) base cloth by using the screen-printing process, where the mesh of the printing plate was 250 mesh/inch$^2$, and the length and width of the conductive coating were respectively 10 cm and 5 mm. The thickness of the conductive coating on the base cloth was measured by FISCHER magnetic/non-magnetic coating thickness gauge to calculate the cross-sectional area of the conductive coating. Then, the electrical resistance on two ends of the conductive coating was measured, and the bulk resistance was calculated by formula 1 (shown below). The components and their usage amount for forming the conductive coating of comparative example 1 and each example are listed in Table 1 below.

$$\text{Electrical resistance} = \text{Bulk resistance} \times \left( \frac{\text{conductive coating length}}{\text{conductive coating area}} \right) \quad \text{Formula 1}$$

TABLE 1

| | Conductive powder | Additive | Base slurry | Bulk resistance ($\Omega \cdot$ cm) |
|---|---|---|---|---|
| Example 1 | 10 | 39.4 | 50.6 | 0.43 |
| Example 2 | 12 | 37.6 | 50.4 | 0.40 |
| Example 3 | 15 | 34.6 | 50.4 | 0.36 |
| Comparative Example 1 | 18 | 31.5 | 50.5 | Not measurable |

Remark 1: The unlabeled units were parts by weight.

As seen from Table 1, the conductive coatings of example 1 to example 3 included 45 parts by weight to 55 parts by weight of the wet conductive powder (i.e., the sum of the conductive powder and the additive) and 45 parts by weight to 55 parts by weight of the base slurry, and the conductive coating of each example included 10 parts by weight to 15 parts by weight of the conductive powder. As a result, the conductive coatings of example 1 to example 3 had suitable bulk resistance to provide good electrothermal effect. In contrast, the conductive coating of comparative example 1 included more than 15 parts by weight of the conductive powder, so the conductive coating was distributed unevenly and aggregated. As such, the bulk resistance of comparative example 1 was not measurable.

Experiment 2: Electrothermal Effect Evaluation of Conductive Coating

In this experiment, the electrothermal effect evaluation was performed on the conductive coatings of example 2 in experiment 1 and comparative example 2. Specifically, after the conductive coating of comparative example 2 and example 2 were printed on the base cloth, a current was provided to the conductive coatings by a power supply for 120 seconds. The temperatures of the conductive coating before and after the current supplying were measured by an infrared thermometer. The results are shown in Table 2.

TABLE 2

| | Power of power supply (W) | Temperature before current supply (° C.) | Temperature after current supply (° C.) |
|---|---|---|---|
| Comparative Example 2 | 8.2 | 25 | 44 |
| Example 2 | 4.5 | 25 | 42 |

Remark 1: Comparative example 2 is CI-2051 purchased from Nagase Taiwan Co., Ltd.

As seen from Table 2, the temperature of the conductive coatings of the comparative example 2 and example 2 were similar after the same current supplying time, where the power of power supply used for example 2 was lower than that of comparative example 2. In other words, example 2 could achieve the goal of electrothermal effect by less power consumption compared to comparative example 2. Therefore, example 2 provided good electrothermal effect.

Experiment 3: Structure Strength Evaluation of Conductive Coating

In this experiment, the structure strength evaluation was performed on the conductive coating of example 2 in experiment 1. Specifically, the washability of the conductive coating of example 2 was measured by the standard method AATC135, and the electrical resistances were measured before and after the washing. The washability results are shown in Table 3. In addition, the bending resistance of the conductive coating of example 2 was measured by the standard method ISO7854, and the electrical resistances were measured before and after the bending. The bending resistance results are shown in Table 4. It should be noted that the washability and bending resistance were respectively tested on different samples of the conductive coating.

TABLE 3

|  | Electrical resistance before washing (kΩ) | Electrical resistance after washing for 10 times (kΩ) | Electrical resistance after washing for 20 times (kΩ) | Electrical resistance change (%) |
|---|---|---|---|---|
| Example 2 | 14.55 | 11.75 | 11.84 | 18.6 |

TABLE 4

|  | Electrical resistance before bending (kΩ) | Electrical resistance after bending for 10000 times (kΩ) | Electrical resistance change (%) |
|---|---|---|---|
| Example 2 | 12.56 | 10.20 | 18.8 |

As seen from Table 3 and Table 4, either being washed for 20 times or being bended for 10000 times, the conductive coating of example 2 showed an electrical resistance change smaller than 20%. This indicated that the structure of the conductive coating of example 2 was strong enough tolerant of the washing or bending. As such, the small electrical resistance change provided the conductive coating with stable electrothermal effect.

According to the above experiments, the conductive coating manufactured by the method of the present disclosure includes appropriate ratio of the conductive powder and the base slurry, leading to the high printing uniformity of the conductive coating. Therefore, the conductive coating printed on the base cloth has good electrothermal effect and high structure strength.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a conductive coating, comprising:
   preparing a conductive powder, comprising uniformly mixing a graphite particle and a carbon black particle and performing a powder refining process thereon to obtain the conductive powder;
   preparing a wet conductive powder, comprising uniformly mixing 10 parts by weight to 15 parts by weight of the conductive powder and 35 parts by weight to 40 parts by weight of a fluid additive to obtain the wet conductive powder;
   preparing a base slurry, comprising uniformly mixing a neoprene and a solvent and performing a ball milling process thereon to obtain the base slurry; and
   performing a centrifugal mixing process, comprising centrifugal mixing 45 parts by weight to 55 parts by weight of the wet conductive powder and 45 parts by weight to 55 parts by weight of the base slurry at 900 rpm to 1000 rpm to obtain the conductive coating having a viscosity between 55000 cP and 60000 cP.

2. The method of claim 1, wherein preparing the wet conductive powder comprising performing a second centrifugal mixing process on the conductive powder and the fluid additive, and wherein the second centrifugal mixing process is a dual asymmetric centrifugal mixing process with 550 rpm to 650 rpm.

3. The method of claim 1, wherein the fluid additive comprises 20 parts by weight to 24 parts by weight of a diluent and 1.5 parts by weight to 3.5 parts by weight of a dispersant.

4. The method of claim 3, wherein the fluid additive further comprises 10 parts by weight to 13 parts by weight of a stabilizer and 1.5 parts by weight to 3.5 parts by weight of a chelating agent.

5. The method of claim 4, wherein the stabilizer comprises a heat stabilizer and a light stabilizer.

6. The method of claim 1, wherein preparing the base slurry comprises uniformly mixing 10 parts by weight to 15 parts by weight of the neoprene and 35 parts by weight to 40 parts by weight of the solvent.

7. The method of claim 1, wherein the centrifugal mixing process is a dual asymmetric centrifugal mixing process.

8. The method of claim 1, wherein the powder refining process comprises grinding the graphite particle and the carbon black particle by a homogenizer at 1100 rpm to 1200 rpm.

9. A conductive coating, comprising:
   45 parts by weight to 55 parts by weight of a wet conductive powder, wherein the wet conductive powder comprises 10 parts by weight to 15 parts by weight of a conductive powder and 35 parts by weight to 40 parts by weight of a fluid additive, and wherein the conductive powder is composed of a graphite particle and a carbon black particle; and
   45 parts by weight to 55 parts by weight of a base slurry, wherein the base slurry comprises a neoprene and a solvent, wherein the conductive coating has a viscosity between 55000 cP and 60000 cP, and wherein a weight ratio of the neoprene and the conductive powder is between 1 and 1.5.

10. The conductive coating of claim 9, wherein a weight ratio of the graphite particle and the carbon black particle in the conductive powder is between 1.8 and 2.2.

11. The conductive coating of claim 9, wherein a particle size of the graphite particle is between 2 μm and 4 μm.

12. The conductive coating of claim 9, wherein a particle size of the carbon black particle is between 38 nm and 42 nm.

13. The conductive coating of claim 9, wherein the conductive powder comprises only nonmetals.

* * * * *